United States Patent [19]

Rourke et al.

[11] Patent Number: 4,720,910

[45] Date of Patent: Jan. 26, 1988

[54] METHOD FOR PREPARING ENCAPSULATED CATHODE MATERIAL

[75] Inventors: John K. Rourke; Gerhart Schwab, both of Chillicothe; Dale R. Shackle, Springboro, all of Ohio

[73] Assignee: MHB Joint Venture, Dayton, Ohio

[21] Appl. No.: 63,336

[22] Filed: Jun. 16, 1987

[51] Int. Cl.$^4$ .............................................. H01M 4/04
[52] U.S. Cl. .................................. 29/623.5; 429/192; 429/218
[58] Field of Search ............... 429/191, 192, 218, 215, 429/217, 232; 29/623.5, 623.1; 427/221, 215; 428/702

[56] References Cited

U.S. PATENT DOCUMENTS

| | | | |
|---|---|---|---|
| 4,303,748 | 12/1981 | Armand et al. | 429/192 |
| 4,576,883 | 3/1986 | Hope et al. | 429/192 |
| 4,589,197 | 5/1986 | North | 29/623.1 |
| 4,654,279 | 3/1987 | Bauer et al. | 429/192 |

*Primary Examiner*—Anthony Skapars
*Attorney, Agent, or Firm*—Smith & Schnacke

[57] ABSTRACT

A method for preparing a cathode material is provided. An insertion compound is ground until small particles of the insertion compound are formed. The insertion compound particles are encapsulated in an electronic and ionic conducting polymer to form the cathode material by using a spray dryer.

11 Claims, No Drawings

METHOD FOR PREPARING ENCAPSULATED CATHODE MATERIAL

BACKGROUND OF THE INVENTION

The present invention provides a method for preparing an encapsulated cathode material, and more particularly, to a method for encapsulating an insertion compound within an ionically and electronically conducting polymeric wall.

Solid state lithium electrochemical cells are known in the art. Typically they consist of a lithium or lithium-based foil anode, a lithium ion conducting polymeric electrolyte, and a cathode based on an insertion electrode material such as $V_6O_{13}$. In order to achieve high active cathode utilization, the cathode has been constructed as a composite comprising the electrode material, a polymeric electrolyte, and an electronically conducting medium such as graphite. Previously, as described in U.S. Pat. No. 4,589,197 to North, these composites have been prepared from a solution of the cathode components in a solvent such as acetonitrile. The solution is cast onto a current collector and the solvent is evaporated to give a sheet or film of the composite cathode on the current collector. In accordance with the teachings of North, the composite cathode is additionally subjected to densification by pressure rolling.

U.S. Pat. No. 4,576,883 to Hope teaches a cathode construction having increased surface area, increased performance characteristics and increased active life in which the insertion compound is encapsulated in an electronically and ionically conducting polymeric material. The principal advantage of encapsulating the insertion compound in the polymeric sphere is a large increase in the available active surface area of the cathode. The insertion compound is also mechanically fixed which increases the active life of the cathode layer.

SUMMARY OF THE INVENTION

The present invention is directed to a method for encapsulating insertion compounds for use in accordance with U.S. Pat. No. 4,576,883.

In accordance with the present invention, insertion compounds are encapsulated by forming a dispersion of an insertion compound, an inorganic salt, and a conductive material in a solution of a polymer in a volatile solvent, and spray drying the dispersion to evaporate the solvent and thereby form a particle in which the insertion compound is encapsulated as a core material in a polymeric shell containing the inorganic salt and conductive material. When the cathode material prepared in accordance with the present invention is used in a solid state lithium cell, it exhibits improved performance characteristics.

In an alternative embodiment the conductive material is withheld from the slurry and admixed with the spray dried particle later. It has been found that while it is desirable to incorporate carbon black in the polymeric shell, it is not essential and that an effective cathode can be prepared from an admixture of a conductive material such as carbon black and the encapsulated cathodic material.

Thus, one object of the present invention is to provide a method for encapsulating an insertion compound to yield a more active cathode material.

Another object of the present invention is to provide a method for preparing a cathode material wherein particles of an insertion compound are encapsulated in an electronically and ionically conducting polymeric material.

A further object of the present invention is to provide a method for preparing a cathode material wherein particles of the insertion compound do not agglomerate.

Other objects and advantages of the present invention will be apparent from the following detailed description.

DETAILED DESCRIPTION OF THE INVENTION

Typical examples of insertion compounds are transition metal oxides, sulfides, and selenides, such as $V_6O_{13}$, $TiS_2$, $MnO_2$, $MoS_3$, $Cr_3O_6$, $Li_xV_3O_8$, $V_3O_8$, and $V_2O_5$. The preferred materials are vanadium oxides such as $V_2O_5$ and $V_6O_{13}$. The preferred vanadium oxide compound, $V_6O_{13}$, is prepared by the thermal decomposition of ammonium metavanadate. The insertion compound material can be useful in both primary and secondary batteries, Polymeric materials useful in the present invention include those having an anionic group covalently bonded to the polymer chain as described in U.S. Pat. No. 4,556,165 to Armand, the atactic polyether having a glass transition temperature less than 0° C. as described in U.S. Pat. No. 4,471,037 to Bomaster, the poly(ethylene oxide) salt described by C. K. Chiang et al., "Synthesis of Ionic Conducting Interpenetrating Polymer Networks," *Polym. Comm.*, 28, 34-5 (Feb., 1987) and also described in U.S. Pat. No. 4,654,279, and the polymeric materials described in European published application 0145498A2.

The preferred conductive polymer material consists of poly(ethylene oxide) containing an inorganic salt to render the polymer ionically conductive and an electronically conductive filler such as carbon black to render the polymer electronically conductive.

Useful salts are described in U.S. Pat. No. 4,303,748 to Christian and include lithium, sodium, potassium, and ammonium salts. Preferred salts are lithium or sodium salts of anions selected from the group consisting of $I^-$, $Br^-$, $SCN^-$, $ClO_4^-$, $BF_4^-$, $PF_6^-$, $AsF_6^-$, $CF_3CO_2^-$, and $CF_3SO_3^-$. The most preferred salts are $LiClO_4$, $NaClO_4$, $LiF_3CSO_3$, and $LiBF_4$.

The insertion compound is typically dispersed in a non-aqueous solution of the polymer in the presence of the conductive filler (which is optional) and salt. The solvent used to dissolve the polymeric material and to disperse the insertion compound, is preferably a relatively low-boiling, non-flammable solvent. Preferred solvents have a boiling point less than 80° C. Useful solvents include chlorinated hydrocarbons, such as methylene dichloride, 1,1,1-trichloroethane, etc. While non-flammable solvents are preferred, flammable solvents can be used with appropriate precautions. Water can be used but is less desirable.

The insertion compound can be ground in a laboratory attritor to the desired particle size. Cell capacity and degree of intercalation are inversely proportional to the particle size of the insertion compound. To obtain cathode particles of sufficiently small size to ensure maximum intercalation, the insertion compound is ground to a particle size of approximately 1 to 5 microns.

In grinding the insertion compound, it is desirable to include a portion of the conductive filler and polymer during the grinding operation in order to prevent the particles of insertion compound from coalescing during or following the grinding process. In the case of fillers such as carbon black, which have a strong structuring effect, the amount must be limited so as not to produce an unworkable mass in the course of the grinding operation.

It is desirable to blend the inorganic salt with the insertion compound as part of the grinding operation. Upon grinding, the salt is believed to dissolve in the polymer. The grind so obtained is mixed with the balance of the required carbon black and polymer solution such that the compositional requirements in the final particle are satisfied.

Typically the components are used in amounts shown in the following Table:

| Compound | Parts by Weight |
| --- | --- |
| Insertion compound | 55 to 95 |
| Inorganic salt | 1.5 to 4.0 |
| Conductive filler | 3.0 to 25 |
| Polymer | 1.5 to 20 |

A useful composition for a particle of encapsulated insertion compound is 70 parts $V_6O_{13}$, 18 parts polyethylene oxide, 2 parts lithium salt, and 10 parts carbon black (50% compressed acetylene black). The slurry composition must be adjusted such that it is suitable for spray drying and, at the same time, provides the desired final particle composition. Upon spray drying, the polymer solution must enwrap the individual particles of the insertion compound.

One factor which determines the slurry composition is the viscosity of the polymer solution. If the polymer solution is too viscous, the slurry will contaminate the atomizing nozzle and form filaments instead of particles. For polyethylene oxide (400,000 M.W.), the limiting concentration is approximately 0.4%. If the concentration significantly exceeds 0.4%, the slurry becomes difficult, if not impossible, to spray dry.

The insertion compound, carbon black, and inorganic salt are added to the slurry in amounts proportional to the composition of the final particle. As a result, in the case of polyethylene oxide in which the concentration is limited to 0.4%, the final slurry contains approximately 2.25% solids. Those skilled in the art will appreciate that other slurry concentrations will result with other polymers and other molecular weights. In each instance, the spray drying characteristics of the polymer solution will determine the polymer concentration used in the slurry. The amounts of the other components of the particle are adjusted in accordance with the final particle composition based on the amount of polymer in the slurry. Thus, when higher concentrations of the polymer are suitable for spray drying, higher slurry concentrations can be used.

It has also been found that the electronic conductor, namely carbon black, need not be incorporated in the particle during spray drying process. Rather, a slurry containing no carbon black can be spray dried to form particles of encapsulated insertion compound and the carbon black can be admixed with the spray dried composition later.

The spray dried particle has a particle size of about 2 to 20 microns and most preferably, less than approximately 5 microns. The final particle size of the encapsulated insertion compound is principally controlled through operation of the spray dryer. Particle size can be controlled by adjusting the slurry and air pressure in the atomizer. In theory, it would be desirable to produce as small a particle as possible, however, the particle should not be so small that it cannot be collected efficiently from the spray dryer. For example, in using spray dryers in which the product is collected using a cyclone, the particle must be sufficiently large that it can be collected in the cyclone. If the particles are too small, they may be expelled with the exhaust air. A tendency has been noticed for the encapsulated particles to agglomerate slightly. This has been found to be advantageous in that it facilitates their collection in the spray dryer. This agglomeration is to be distinguished from agglomeration of the particles of insertion compounds themselves. In this case, because the insertion compound is encapsulated, the particles of the insertion compound maintain their integrity and their higher surface area and activity.

The primary advantage of the polymer coated particles of the present invention is a large increase in the available active surface area of the cathode. Also, the insertion compound cathode material is mechanically fixed within each sphere which increases the active life of the cathode layer. Further, since each sphere is in contact with other conductive particles, an electronically conductive network or grid exists across and through the cathode. The voids existing between the particles allow diffusional access for the lithium ions to any part of the cathode layer.

The encapsulated cathode material prepared by the method of the present invention is useful in the solid state electrochemical cell described in U.S Pat. No. 4,576,883 as well as cells employing liquid electrolytes. The solid-state electochemical cell disclosed in the patent comprises an anode layer, a cathode layer in the form of an electronically and ionically conductive polymer encapsulated insertion compound, and a polymer electrolyte layer. The three-layer structure, in the form of a sheet, roll, tape, etc. forms a simple cell or battery. Such structures can employ various additional layers, including current conducting backing layers, insulating layers, and/or bipolar electrode connections. Such simple batteries may be connected or combined in stacks to form multi-cell electrochemical devices.

Typically, electrochemical cells are formed as simple disc sandwiches. However, large area cells may be fabricated using a "swiss-roll" technique around a central mandrel, or a "concertina" configuration, sandwiched between two stainless steel plates. Both of these methods are well-known to the artisan. The encapsulated particles can be coated onto a conductive substrate or current collector to form a cathode by dispersing the particles in a solution of a binder material such as poly(ethylene oxide) and coating this composition onto the conductive substrate which is typically a metal foil such as a nickle foil. The cathode layer is typically about 25 to 30 microns thick. It has been found preferable to employ vanadium oxide of approximately 50%, by volume, of the total cathode, including the added matrix material, if used. After coating, the composition is dried. When the polymer shell does not include the conductive filler, the filler may be added directly to coating composition. Enough filler must be used to establish an electronically conductive network.

Another method for forming the cathode has also been developed wherein the encapsulated insertion compound is coated onto the current collector as a dry powder and compressed to cause the particles to fuse together and adhere to the collector. If the conductive filler is not in the polymer shell it is admixed with the encapsulated insertion compound before compression. Again, sufficient conductive filler is used to establish an electronically conductive network within the cathode layer.

The electrolyte layer of the cell is produced from the appropriate polymer film using the so-called "doctor-blade" technique. According to this method, a solution of the polymer (or polymer compounded with inorganic material) is prepared in a suitable solvent and cast as a film onto a sheet, for example, of waxed paper, passing beneath a fixed reservior positioned at one end of a flat platform. The front face of the reservoir is adjustable in height and the setting of the gap between the doctor-blade and the paper sheet determines the thickness of the cast film. Evaporation of the solvent causes a uniform reduction in film thickness by an amount which is dependent on the concentration of the solution. This technique of creating a thin film layer is familiar to those skilled in the art, and can be used to form very thin films of approximately 25-50 micrometer thickness. Another potentially useful method is described in U.K. patent application No. 2,149,197A.

Electrochemical cells include those in which the anode is constituted by an alkali metal such as lithium, sodium or potassium, an intermetallic compound thereof such as an alkali metal silicone or aluminum alloy or by an insertion compound of an alkali metal. In the preferred case, the anode layer is a lithium metal foil or a lithium/aluminum alloy foil.

In electrochemical lithium cells, a battery grade lithium foil of 350 microns thickness has previously been used. Use of this foil represents a large excess of lithium and it is preferable to use a thin anode in the form of a lithium/aluminum alloy formed by cathodic reduction of aluminum foil in a lithium salt solution. Lithium deposited on the surface of the foil is allowed to accumulate to a thickness of 10 to 20 microns on the surface of the aluminum foil. The structural integrity of the anode layer is maintained by allowing more than one half of the thickness of the aluminum foil to be uncovered.

Lithium on copper foils, for example, an 80 micron copper foil with a 20 micron lithium layer, will also serve as a satisfactory anode. This anode structure is compatible with the construction of large area, thin film cells.

The polymeric electrolyte composition is formed by compounding a salt and a polymeric material such as polyethylene oxide. The polymers and salts described above can be used. Polyethylene oxide and lithium salt are compounded by, for example, milling the heated polymer with crystals of lithium perchlorate to achieve subtantially uniform mixing. Alternatively, a solvent is combined with the polymer to improve its film-forming qualities and the salt introduced into the polymer in solution. The resulting mixture may be deposited as a film directly onto the cathode layer of the cell. This mixture is applied by the doctor-blade technique referred to previously which leads to good reproducibility of the electrolyte layer, which is optimally in the order of 25 micrometers.

Additional ionically conductive polyethylene oxide can be applied to the layer of particles to form a matrix around the particles and fill the voids therebetween which increases the mechanical stability of the layer and provides improved diffusional properties.

The present invention is more fully illustrated by the following non-limiting example.

EXAMPLE

The attritor used was a small laboratory-scale device (i.e., Union Process, Model 01) charged with 1857 g of 5 mm. diameter spherical steel grinding medium. One quarter of the steel balls was placed into the attritor followed by 100 g of $V_6O_{13}$ and 100 g of a 2.0 wt. % poly(ethylene oxide) solution (M.W. 400,000) in 1,1,1-trichloroethane. A 300 g portion of fresh 1,1,1-trichloroethane was added with the remaining steel balls. The attritor was powered by a 100 volt setting on the autotransformer and the slurry temperature was maintained at 21° C. in the water jacketed milling vessel. After the initial 70 minutes of grinding 2.86 g of lithium trifluoromethane sulfonate was added together with an additional 30 ml of the chlorinated solvent. Grinding was continued for 280 minutes after which time 5.00 g acetylene black (Chevron 50% compressed) was added. After 70 minutes more grinding the run was stopped. 30.37 g of the above attritor grind slurry was blended with 68.60 g of 2% poly(ethylene oxide), (400,00 M.W.) in 1,1,1-trichloroethane and 0.54 g additional acetylene black. This mixture was sprayed dried after dilution to a total of 600 g with 1,1,1-trichloroethane. The mixture was spray dried using a Model GA-31 Spray Dryer manufactured by Yamoto Scientific Co, Ltd., Tokyo, Japan. The spray drier was operated at a slurry pumping rate of 6.6 gm/min at an inlet gas temperature setting of 80° C. The spray dryer feed slurry contained 1.39% solids, and the PEO concentration was 0.25%. The composition of the spray dried particles is given below:

| Component | Weight (g) | % by Weight (dry) |
|---|---|---|
| $V_6O_{13}$ | 5.833 | 70.00 |
| Acetylene Black | 0.833 | 10.00 |
| $LiCF_3SO_3$ | 0.167 | 2.00 |
| PEO | 1.500 | 18.00 |

The resulting particles were shown by scanning electron microscopy to have diameters of 2-20 microns and showed clearly visible carbon particles on their shells.

Having described the invention in detail and by reference to preferred embodiments thereof, it will be apparent that modifications and variations are possible without departing from the scope of the invention defined in the appended claims.

What is claimed is:

1. A method for preparing a cathode material comprising the steps of:
   forming a dispersion of an insertion compound, and an inorganic salt in a solution of a polymer in a volatile solvent, and spray drying said dispersion to remove said solvent and thereby form particles having said insertion compound as a core material encapsulated in a polymeric shell containing said inorganic salt.

2. The method of claim 1 wherein said insertion compound is a transition metal oxide, sulfide, or selenide.

3. The method of claim 2 wherein said insertion compound is a vanadium oxide.

4. The method of claim 3 wherein said inorganic salt is a salt selected from the group consisting of lithium salt, sodium salt, potassium salt, and ammonium salt.

5. The method of claim 4 wherein said inorganic salt is a salt of an anion selected from the group consisting of $I^-$, $Br^-$, $SCN^-$, $ClO_4^-$, $BF_4^-$, $PF_6^-$, $AsF_6^-$, $CF_3CO_2^-$, and $CF_3SO_3^-$.

6. The method of claim 4 wherein said slurry additionally includes a conductive filler.

7. The method of claim 6 wherein said conductive filler is carbon black.

8. The method of claim 5 wherein said salt is a lithium salt.

9. The method of claim 8 wherein said polymer is poly(ethylene oxide).

10. The method of claim 1 wherein said insertion compound has a particle size of about 1 to 5 microns.

11. The method of claim 1 wherein said particles have a particle size of about 2 to 20 microns.

* * * * *